(12) United States Patent
Shahar et al.

(10) Patent No.: US 8,694,701 B2
(45) Date of Patent: Apr. 8, 2014

(54) RECOVERING DROPPED INSTRUCTIONS IN A NETWORK INTERFACE CONTROLLER

(75) Inventors: Ariel Shahar, Jerusalem (IL); Hillel Chapman, Ein HaEmek (IL); Roi Aibester, Metar (IL)

(73) Assignee: Mellanox Technologies Ltd., Yokneam (IL)

( * ) Notice: Subject to any disclaimer, the term of this patent is extended or adjusted under 35 U.S.C. 154(b) by 95 days.

(21) Appl. No.: 13/326,354

(22) Filed: Dec. 15, 2011

(65) Prior Publication Data

US 2013/0159568 A1 Jun. 20, 2013

(51) Int. Cl.
*G06F 3/00* (2006.01)
*G06F 15/16* (2006.01)

(52) U.S. Cl.
USPC ............... 710/54; 710/52; 710/55; 709/232; 709/234

(58) Field of Classification Search
None
See application file for complete search history.

(56) References Cited

U.S. PATENT DOCUMENTS

| 5,713,044 | A | | 1/1998 | Gillespie et al. |
|---|---|---|---|---|
| 5,862,407 | A | | 1/1999 | Sriti |
| 5,991,797 | A | | 11/1999 | Futral et al. |
| 6,098,121 | A | | 8/2000 | Furuya |
| 6,134,648 | A | | 10/2000 | Peterson et al. |
| 6,145,062 | A | * | 11/2000 | Chittor et al. ................. 711/154 |
| 6,199,121 | B1 | | 3/2001 | Olson et al. |
| 6,347,337 | B1 | | 2/2002 | Shah et al. |
| 6,735,642 | B2 | | 5/2004 | Kagan et al. |
| 6,888,792 | B2 | | 5/2005 | Gronke |
| 7,058,723 | B2 | * | 6/2006 | Wilson .......................... 709/235 |
| 7,653,754 | B2 | * | 1/2010 | Kagan et al. ................... 709/250 |
| 7,822,906 | B2 | * | 10/2010 | Fan et al. ....................... 710/310 |
| 2002/0150106 | A1 | | 10/2002 | Kagan et al. |
| 2002/0152327 | A1 | | 10/2002 | Kagan et al. |
| 2002/0165897 | A1 | | 11/2002 | Kagan et al. |
| 2003/0078980 | A1 | * | 4/2003 | Carstens et al. ............... 709/206 |
| 2012/0151262 | A1 | * | 6/2012 | Nakayama et al. ............. 714/22 |

OTHER PUBLICATIONS

Buonadonna et al., "Queue pair IP: a hybrid architecture for system area networks", Proceedings of the 29th Annual International Symposium on Computer Architecture, pp. 247-256, May 25-29, 2002.
Dunning et al., "The Virtual Interface Architecture", IEEE Micro, vol. 18, No. 2, pp. 66-76, Mar.-Apr. 1998.
PCI Express Base Specification, Revision 2.1, Mar. 4, 2009.

* cited by examiner

*Primary Examiner* — Michael Sun
(74) *Attorney, Agent, or Firm* — D. Kligler I.P. Services Ltd.

(57) ABSTRACT

A method for operating a peripheral device includes receiving at the peripheral device service orders, which are identified with respective service instances and are submitted to the peripheral device over the bus by software applications running on a host processor, which write copies of the service orders to a memory. The received service orders are queued for execution by the peripheral device. When one or more of the service orders have been dropped from the queue prior to execution, a recovery of a selected service instance is initiated by submitting a read request from the peripheral device to the memory over the bus to receive a copy of any unexecuted service order associated with the service instance.

24 Claims, 3 Drawing Sheets

RECOVERING DROPPED INSTRUCTIONS IN A NETWORK INTERFACE CONTROLLER

FIELD OF THE INVENTION

The present invention relates generally to computer systems, and particularly to interaction between a host and a peripheral device in a computer system.

BACKGROUND

Some types of advanced high-speed input/output (I/O) devices, such as network interface controllers (NICs), permit applications running on a host processor to interact directly with the functions of the I/O device, without kernel calls to the host operating system. Such I/O devices may support multiple service instances, which are allocated to client processes, such as host applications. The client processes submit work requests, typically by writing descriptors of the requests to respective queues in the host memory, which are then read and executed by the I/O device. The I/O device is responsible for allocating its resources to the different service instances while ensuring that the work requests in each queue are executed in the proper order.

U.S. Pat. No. 6,735,642, whose disclosure is incorporated herein by reference, describes methods for interaction between application programs and a DMA engine. In order to initiate a chain of DMA data transfers, an application program running on a CPU prepares the appropriate chain of descriptors in a memory accessible to the DMA engine. The application then sends a service order to the DMA engine indicating the memory address of the first descriptor in the chain, which is a request to the DMA engine to start execution of the descriptors. The application typically writes the service order to the "doorbell" of the DMA engine—a control register with a certain bus address that is specified for this purpose. Sending such a message to initiate DMA execution is known as "ringing the doorbell" of the DMA engine.

The DMA engine responds by reading and executing the first descriptor. It then updates a status field of the descriptor to indicate to the application that the descriptor has been executed. The engine follows the "next" field through the entire linked list, marking each descriptor as executed, until it reaches a null pointer in the last descriptor. After executing the last descriptor, the DMA engine is ready to receive a new list for execution. The DMA doorbell may be rung multiple times without loss of data and without executing the same descriptor multiple times.

U.S. Pat. No. 7,653,754, whose disclosure is incorporated herein by reference, describes a method for preventing deadlock in communication between a host software application and a NIC without requiring either separate write and read paths or synchronization between users. The method comprises writing a doorbell associated with at least one descriptor having a descriptor context to a buffer in the NIC, dropping at least one doorbell from the buffer if the buffer is full, thereby allowing a write of a new doorbell to the buffer, and recovering each dropped doorbell for further execution of descriptors associated with this doorbell. The descriptor execution is in order of posting by the application to the NIC.

SUMMARY

Embodiments of the present invention that are described hereinbelow provide methods for efficient interaction between a peripheral device and applications running on a host processor.

There is therefore provided, in accordance with an embodiment of the present invention, a method for operating a peripheral device, which is connected to a host processor and a memory by a bus. The method includes receiving at the peripheral device service orders, which are identified with respective service instances and are submitted to the peripheral device over the bus by software applications running on the host processor, which write copies of the service orders to the memory. The received service orders are queued for execution by the peripheral device. When one or more of the service orders have been dropped from the queue prior to execution, a recovery of a selected service instance is initiated by submitting a read request from the peripheral device to the memory over the bus to receive a copy of any unexecuted service order associated with the service instance. Upon receiving at the peripheral device a new service order that is identified with the selected service instance and reaches the peripheral device before the peripheral device receives a response to the read request, the new service order is executed, and the response is ignored when it is received.

In a disclosed embodiment, receiving the service orders include receiving entries written by the applications to a doorbell register at an address on the bus that is assigned to the peripheral device. Typically, the software applications submit the service orders by posting a write operation to the bus, and the bus operates in accordance with a protocol that causes posted writes to be flushed from the bus to the peripheral device before delivering read responses.

The method may include executing the service orders on a given service instance by reading into the peripheral device a context of the given service instance from the memory, and applying the context in performing an operation indicated by the service order (wherein the context is updated to reflect the last work request that is to be executed). Typically, the peripheral device has no dedicated memory for storing the context after the operation has been completed.

In some embodiments, the method includes setting a flag in the peripheral device to indicate that the one or more of the service orders have been dropped, and initiating the recovery includes reading and resetting the flag to initiate the recovery. The flag is typically one of an array of flags in the peripheral device, and each flag causes the peripheral device to initiate the recovery of a corresponding set of the service instances.

In a disclosed embodiment, initiating the recovery includes making a record of the service instances that are in recovery, and ignoring the response includes checking the record to determine that the service instance is in recovery, and discarding the response responsively to the record.

In some embodiments, the peripheral device includes an input/output (I/O) device, and the execution of the service orders causes the I/O device to transfer data to and from the memory. The I/O device may include a network interface controller (NIC), wherein the service instances include queue pairs, which are respectively assigned to the software applications for use in communicating over a network via the NIC. In one embodiment, the service orders indicate work requests, which are descriptors including direct memory access (DMA) instructions for execution by the peripheral device. Additionally or alternatively, the service orders may cause the peripheral device to arm a completion queue in the memory in order to trigger an event upon posting of a new completion queue entry to the armed completion queue.

There is also provided, in accordance with an embodiment of the present invention, a computer peripheral device, including a host interface, which is configured to be connected to a bus, which is coupled to a host processor and a memory, and is configured to receive over the bus service orders, which are identified with respective service instances and are submitted by software applications running on the host processor, which write copies of the service orders to the memory. Processing circuitry is configured to queue the received service orders in a queue for execution. Execution of the service order is carried out by updating the respective service instance context with an indication of last work request that requires execution. When one or more of the service orders are dropped from the queue prior to execution, the processing circuitry initiates a recovery of a selected service instance by submitting a read request via the host interface to the memory over the bus to receive a copy of any unexecuted service order associated with the service instance. The processing circuitry is configured, upon receiving via the host interface a new service order that is identified with the selected service instance and reaches the peripheral device before the processing circuitry receives a response to the read request, to execute the new service order and ignore the response when it is received.

The present invention will be more fully understood from the following detailed description of the embodiments thereof, taken together with the drawings in which:

DETAILED DESCRIPTION OF EMBODIMENTS

Overview

Figure 1:
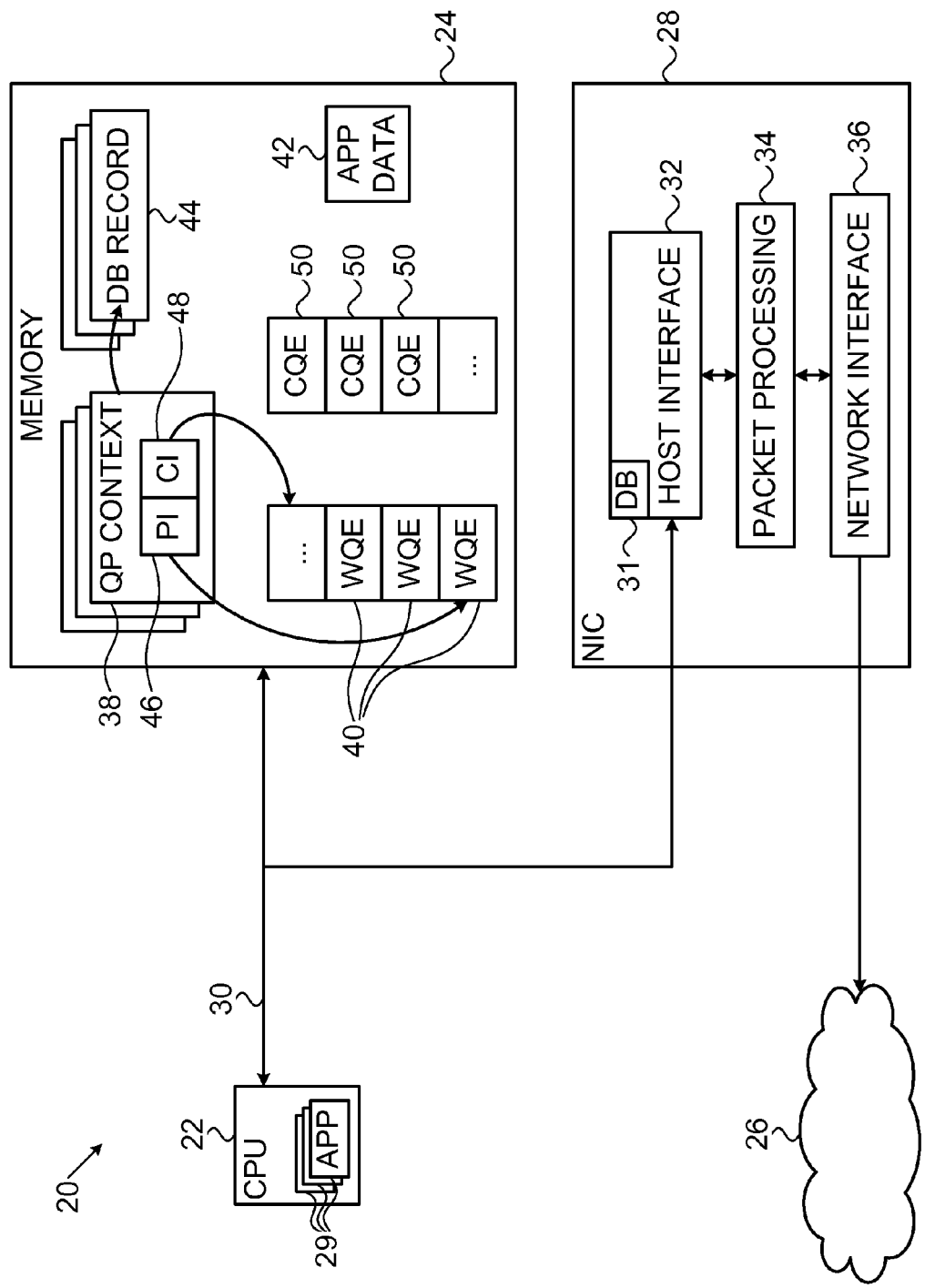
FIG. 1 is a block diagram that schematically illustrates a computer system, in accordance with an embodiment of the present invention.

Modern peripheral devices, particularly I/O devices, such as NICs, are required to handle huge volumes of data at high speed. Some types of NICs, such as InfiniBand® host channel adapters (HCAs), perform complex protocol-offload functions in direct interaction with software applications running on a host processor. Each software application may be assigned multiple transport service instances (known as queue pairs, or QPs, in the InfiniBand architecture), and the NIC may have to service hundreds or thousands of these service instances concurrently. Each service instance has its own context, which is normally stored in the host memory, along with descriptors (work queue elements, or WQEs, in InfiniBand) defining work requests submitted to the NIC by the applications. The NIC reads the context information and the associated descriptors from the host memory in order to fulfill the work requests for the applications.

Typically, the NIC has a small buffer memory for holding context information for the service instances that the NIC is currently serving. The NIC may have a larger, dedicated context memory of its own, which can reduce the need for frequent access to the host memory, but such a memory increases the size and cost of the NIC. Therefore, in some embodiments of the present invention, the NIC has no dedicated memory for storing the context of a given service instance after it has completed operations on that service instance, and instead the NIC fetches the context of each service instance from the host memory as required by current operations. The methods that are described below are useful in avoiding problems that may arise due to the resultant need of the NIC for continual access to context information in host memory.

In the disclosed embodiments, the host processor, host memory and a peripheral device, such as a NIC, are connected by a system bus, such as a PCI Express® bus, as is known in the art. Applications running on the host processor write descriptors to the memory and then submit service orders to the NIC (or other peripheral device), instructing the NIC to read and execute the descriptors. The service orders may have the form of doorbell entries, which are written by the applications via the bus to a doorbell register at an address on the bus that is assigned to the NIC. Before posting their doorbell entries to the bus, the applications create records of the entries in the host memory, for use, if necessary, in recovery from lost doorbells, as described below. Each doorbell entry is associated with a corresponding service instance (such as a QP) that is assigned to the application that posted it, and the records of the doorbell entries are linked in the host memory to the context of the service instance.

The NIC queues the doorbell entries that it receives via the bus for execution. When an entry reaches the head of the queue, the NIC reads the corresponding context and updates it with an indication of the last work request that requires execution. The NIC then reads the corresponding descriptors, and carries out the appropriate actions (such as transferring data to or from the host memory in packets conveyed over a network). Under normal operating conditions, all queued doorbell entries are serviced in turn. It may sometimes occur, however, that a doorbell entry is dropped prior to execution, due to overflow of the limited available buffer space in the NIC, for example.

Upon detecting that a doorbell entry has been dropped, the NIC initiates a recovery procedure to access the records of the lost doorbell entries that are held in the host memory and to execute the corresponding service requests. In order to access the doorbell copies for a given service instance, the NIC submits a read request to the bus and awaits the read response. In the meanwhile, however, the application to which the service instance is assigned may write a further doorbell entry (i.e., submit a new service order) for the same service instance that is in the process of recovery. Furthermore, in some bus protocols, such as the PCI Express protocol, posted writes are given priority and thus are flushed from the bus before any pending read responses are delivered. Thus, the new doorbell entry may reach the queue in the NIC before the earlier-sent read response. This sort of situation could lead the NIC to read and execute at least some of the descriptors for this service instance twice.

In embodiments of the present invention, the NIC avoids this sort of erroneous duplication of work by ignoring any doorbell read response that follows a posted doorbell write on the same service instance during recovery. To identify such situations, the NIC maintains a record of the service instances that are in recovery at any given time and checks incoming doorbell entries against this record in order to decide which (if any) read responses to drop. The doorbell records and the descriptors are arranged in the host memory, in conjunction with the corresponding context information, so as to ensure that a doorbell entry received by the NIC during recovery will cause the NIC to execute all outstanding descriptors exactly once, in the order in which they were posted.

System Description

FIG. 1 is a block diagram that schematically illustrates a computer system 20, in accordance with an embodiment of the present invention. System 20 comprises a CPU 22, a host memory 24, and a NIC 28, which links system 20 to a network 26. The elements of system 20 are interconnected by a system bus 30, which is assumed, for the sake of clarity and convenience, to be a PCI Express bus. Software applications 29 running on CPU 22 read data from and write data to memory 24 via bus 30, as does NIC 28. In the description that follows, it will be assumed (again, for clarity and convenience) that network 26 comprises an InfiniBand switch fabric, and that NIC 28 is a HCA. The principles of the present invention, however, are applicable not only to NICs (and specifically HCAs), but also to other types of I/O devices, and other sorts of peripheral devices, as well.

NIC 28 comprises a host interface 32, which is connected to bus 30 and includes one or more registers with pre-assigned addresses on the bus, including a doorbell register 31. A network interface 36 in NIC 28 comprises one or more ports (not shown), for receiving data packets from and transmitting data packets to network 26, in accordance with instructions received from applications running on CPU 22. Processing circuitry 34 in NIC 28 receives these instructions from host interface 32, and carries out the instructions as described below.

Typically, circuitry 34 comprises dedicated and/or programmable hardware logic circuits, which are designed to carry out a range of functions associated with packet transmission and reception. These functions include constructing data packets containing data gathered from memory 24 for transmission over network 26, as well as receiving and processing incoming packets from network 26 and scattering the data contained in the packets to memory 24. The description that follows relates only to the elements of circuitry 34 that are necessary to an understanding of doorbell handling in system 20; other components of NIC are known in the art, as described, for example, in U.S. Patent Application Publication 2002/0152327, whose disclosure is incorporated herein by reference.

Applications 29 running on CPU 22 communicate with the transport layer of network 26 via NIC 28 by manipulating a transport service instance, known as a "queue pair" (QP), which is made up of a send work queue and a receive work queue. A given application may open and use multiple QPs simultaneously. Each QP has a context 38, comprising information used by the corresponding application and by NIC 28 in servicing the QP. Typically, NIC 28 serves multiple QPs concurrently, each with its corresponding context, to transmit and receive messages to and from processes on other nodes of network 26. The messages generally comprises remote DMA (RDMA) write and read requests and responses, as well as data push (send) messages, in which NIC 28 transfers application data 42 between memory 24 and network 26.

To send and receive communications over network 22, an application process initiates work requests, which causes descriptors of work items, referred to as work queue elements (WQEs) 40, to be placed in the appropriate queues for execution by the NIC. Upon completion of work items, the NIC writes completion queue elements (CQEs) 50 to appropriate completion queues, which are then read by the application as an indication that the work request in question has been completed. WQEs 40 and CQEs 50 are typically written to memory 24 in a cyclic manner, with pointers to the heads and tails of the lists held in the corresponding context 38. NIC 28 and applications communicating with the NIC use these pointers in reading from and writing to the appropriate queues.

To initiate operations by NIC 28 on a given QP, application 29 to which the QP is assigned submits one or more work requests, causing WQEs 40 to be written to the corresponding work queue. Context 38 is updated as appropriate, to point to the next WQE for execution. The application prepares a doorbell entry, which indicates the number of the QP for which the work is requested and includes a counter value, referred to as a producer index (PI) 46, which reflects the number of WQEs that have been posted to this queue since its creation. The application writes a doorbell record 44, containing a copy of the doorbell entry, to a location to memory 24 indicated by QP context 38.

Once these preparations are done, application 29 posts a write request to bus 30, causing the doorbell entry (indicating the QP number and PI) to be written to doorbell register 31 of NIC 28. Normally, as noted above, the NIC queues and then processes each such doorbell entry in its turn, by registering the newly-received PI in the PI field in the QP context. The NIC then reads the appropriate QP context 38, locates the next WQE 40 to be executed, and proceeds to perform the operations indicated by the WQE descriptors. The NIC updates a consumer index (CI) 48 to indicate the last WQE that it has read and processed. When PI 46 and CI 48 are equal for a given QP, there are no further work requests awaiting execution on that QP.

On the other hand, in some cases, NIC 28 may drop one or more of the doorbell entries, due to buffer overflow, for example. In this case, NIC 28 may use doorbell records 44 in order to recover the operations of the QP or QPs in question. This recovery process is described in detail hereinbelow.

Dropped Doorbell Recovery

Figure 2:
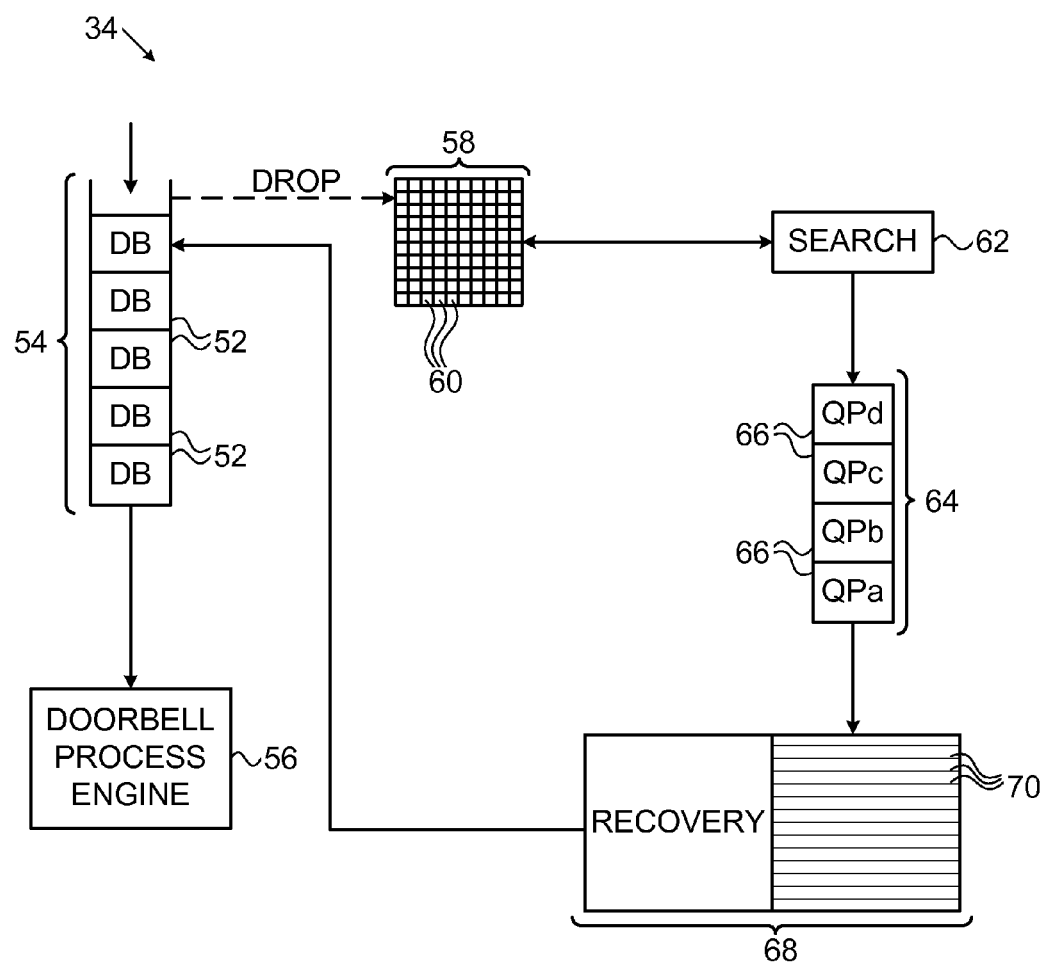
FIG. 2 is a block diagram that schematically shows elements of a NIC, in accordance with an embodiment of the present invention.
Figure 3:
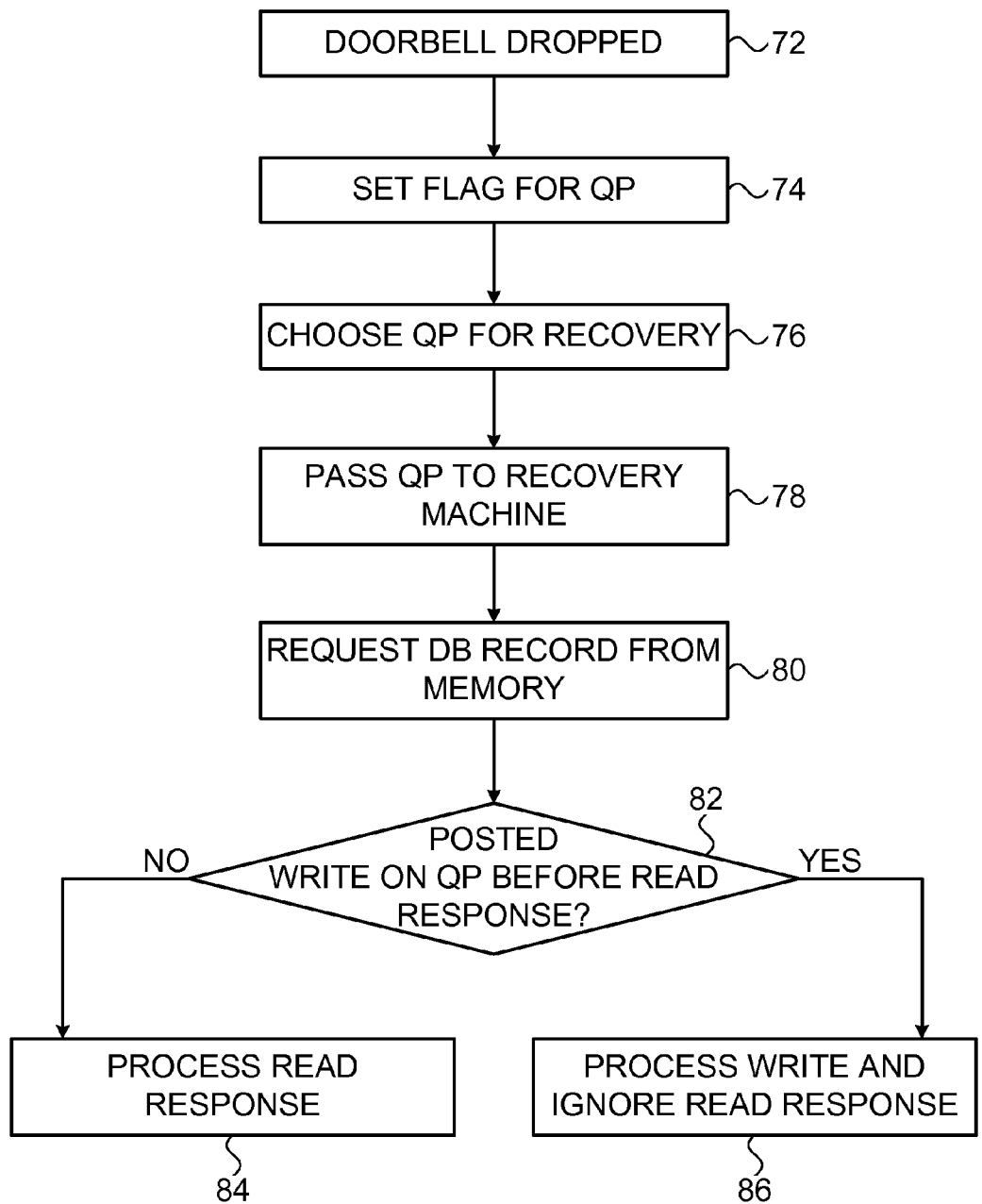
FIG. 3 is a flow chart that schematically illustrates a method for handling of dropped doorbell entries, in accordance with an embodiment of the present invention.

Reference is now made to FIGS. 2 and 3, which schematically illustrate the handling of dropped doorbell entries by NIC 28, in accordance with an embodiment of the present invention. FIG. 2 is a block diagram showing elements of processing circuitry 34 in NIC 28 that are involved in servicing doorbells, and particularly dropped doorbells. (Other elements of the processing circuitry that are not needed for an understanding of this functionality are omitted for the sake of simplicity.) FIG. 3 is a flow chart illustrating a method for handling dropped doorbells. The flow chart presents the key functional steps involved in the doorbell recovery process, while FIG. 2 shows a particular implementation that may be used to carry out this process. Alternative implementations will be apparent to those skilled in the art after reading the following description and are considered to be within the scope of the present invention.

Processing circuitry 34 places the doorbell entries that are received in doorbell register 31 into a doorbell queue 54 for execution. In the normal course of operation, a doorbell processing engine 56 reads each entry 52 from the head of queue 54, extracts the QP number, and uses this information to fetch the appropriate QP context 38 from memory 24. Engine 56 refers to the PI number in entry 52 in order to read and execute WQEs 40 that have been queued in memory 24 for the QP in question. When these operations have been completed, circuitry 34 discards the context information (while keeping an updated copy of the context information in host memory) and moves on to process further doorbell entries.

Circuitry 34 is typically designed to handle the full communication workload of system 20, but it may nonetheless occur that queue 54 fills faster than engine 56 can service it. In this case, circuitry 34 may drop one or more doorbell entries 52 from queue 54, at a doorbell dropping step 72. Typically, entries are dropped from the tail of the queue, but other criteria may alternatively be applied in selecting the entries to be dropped.

To ensure that the dropped doorbell entries are subsequently serviced, circuitry 34 sets a flag 60 in a bit array 58 in NIC 28, at a flag setting step 74. This flag will initiate a recovery process in which the NIC will poll active QPs in memory 24 for unexecuted doorbell records 44. A single flag of this sort in NIC 28 would be sufficient for this purpose, but it would require the NIC then to poll all active QPs whenever a doorbell entry is dropped. On the other hand, array 58 could contain a respective flag 60 for every one of the available QPs (which may number many millions), but this option would be prohibitive in terms of memory size. Therefore, in the disclosed embodiment, array 58 contains, for example, 64K flags. When a doorbell entry is dropped, the flag corresponding to sixteen designated bits of the QP number in the doorbell entry is set in array 58.

A search machine 62 scans array 58 continually for set flags. Upon discovering that a given flag 60 has been set, the search machine writes the numbers of all the QPs that this flag could represent to a recovery addresses queue 64, at a QP selection step 76. Machine then resets the flag. Because each flag 60 can represent many different QPs, multiple QPs 66 may be placed in queue 64 for each flag that is set, even though only one of these QPs actually requires doorbell recovery. The remaining QPs go through a process of "false recovery," which consumes some resources of system but does not have any functional effect on the operation of these remaining QPs.

Circuitry 34 conducts a polling process to identify the QP that actually requires recovery. For each QP 66 in queue 64, circuitry 34 checks whether the QP number is valid (i.e., whether this QP is active) and checks the addresses in memory 24 at which context 38 (specifically, PI 46) and doorbell record 44 for this QP are held, at an address retrieval step. When circuitry 34 determines that a given QP 66 in queue 64 is valid, the circuitry passes the QP for recovery to a recovery machine 68, at a recovery submission step 78.

Recovery machine 68 maintains an array of QP records 70 to track the status of QPs in recovery. For each QP in recovery, circuitry 34 submits a read request over bus 30 to memory 24 to receive the latest doorbell record 44 and context information, at a record request step 80. Until the doorbell record has been received over bus 30 and processed by recovery machine 68, the QP record 70 for the QP in question typically remains in the array of machine 68. After recovery has been completed, i.e., when any outstanding doorbell record for the QP has been retrieved and processed by machine 68, the corresponding QP record is marked invalid and can be overwritten by the next QP 66 in queue 64.

The recovery process of FIGS. 2 and 3 is typically transparent to applications 29 that runs on CPU 22 and submit work requests for execution by NIC 28. Thus, while recovery of a given QP is in progress, the application to which the QP is assigned may submit further work requests, causing addition WQEs 40 to be queued in memory 24 and further doorbell entries to be written to doorbell register 31. Bus 30 may give precedence to these posted doorbell writes over responses to doorbell read requests, i.e., posted writes may be flushed from the bus to NIC 28 before responses to pending read requests are delivered. This sort of behavior is typical, for example, of the PCI Express bus protocol.

The result of such bus behavior is that the later doorbell entry that is conveyed by the posted write operation on bus 30 may reach NIC 28, at a write arrival step 82, before the earlier doorbell record 44 that is conveyed by the read response. Processing the doorbell record under these circumstances could result in certain WQEs 40 being executed twice. To avoid this sort of situation, when circuitry 34 receives a new doorbell entry by posted write, it checks whether the QP number indicated by the doorbell entry is listed in a record 70 in recovery machine 68 and, if so, indicates in the record that when a read response is received for this QP, it should be discarded.

Upon receiving a read response from bus 30 containing a doorbell record 44, recovery machine 68 checks whether the corresponding QP record 70 indicates that the response should be discarded. If not, the recovery machine puts the doorbell record into queue 54. When the doorbell record reaches the head of the queue, engine 56 checks the PI value in the doorbell record against the QP context information, at a read response processing step 84. Engine 56 determines at this step whether this doorbell entry has already been serviced, i.e., whether the PI value in the QP context is already updated with the PI of this doorbell. For QPs undergoing "false recovery," as defined above, all doorbell entries will have already been serviced, and engine 56 therefore takes no further action. When the comparison of the PI value in the doorbell record and the QP context received by recovery machine 68 indicates that the QP in question has new WQEs awaiting execution, however, engine 56 will process this doorbell entry, and recovery of the QP will then be complete.

On the other hand, when circuitry 34 receives a new doorbell entry for a QP in recovery by posted write from bus 30 (and queue 54 is not full), this entry is placed directly into queue 54, while indicating in the corresponding QP record 70 that the read response should be discarded. As a result, the doorbell entry thus written will be processed in its turn by engine 56, but any doorbell read response received subsequently from bus 30 for this QP will be ignored, at a record dropping step 86.

Although the description above relates to handling of doorbells associated with WQEs 40 posted by applications 29, similar circuits and methods may be applied to CQEs 50, which are descriptors written to memory 24 by NIC 28 to report completion of work requests. In the case of CQEs, applications 29 submit service orders, in the form of doorbell entries written to doorbell register 31 of NIC 28, in order to "arm" their respective completion queues. When a completion queue is armed in this manner, NIC 28 will trigger an event (typically by writing an event queue entry to a certain pre-configured event queue) upon writing a CQE to the completion queue and thus will notify the corresponding application that the work request has been fulfilled.

Before submitting a completion doorbell entry to NIC 28, applications write a doorbell record 44 to memory 24, as described above. Completion doorbell entries and records contain the CQE consumer index, indicating the last CQE 50 read by the application, rather than the producer index as in the case of WQE doorbells. In the normal course of events, NIC 28 queues and services these doorbell entries in the manner described above, and thus arms the corresponding completion queues.

When a completion doorbell entry is dropped from queue 54, circuitry 34 raises a flag 60 in array 58, and recovery proceeds substantially in the manner described above. To support recovery of both WQE and CQE doorbells, array 58 may comprise distinct sub-arrays for the two types of doorbells, keyed by QP numbers and CQ numbers, respectively. Completion doorbell recovery proceeds in similar fashion to that shown in FIG. 3, but operates on completion queues, rather than QPs, with changes to the process as appropriate.

Although the embodiments described above relate to handling of certain specific types of service orders ("doorbells") by a particular sort of peripheral device (a NIC), the principles of the present invention may similarly be applied in handling of other types of service orders by various sorts of peripheral devices, and particularly in recovering from loss of such service orders, which may occur, for example, due to buffer overflow. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for operating a peripheral device, which is connected to a host processor and a memory by a bus, the method comprising:
   receiving at the peripheral device service orders, which are identified with respective service instances and are submitted to the peripheral device over the bus by software applications running on the host processor, which write copies of the service orders to the memory;
   queuing the received service orders in a queue for execution by the peripheral device;
   when one or more of the service orders have been dropped from the queue prior to execution, initiating a recovery of a selected service instance by submitting a read request from the peripheral device to the memory over the bus to receive a copy of any unexecuted service order that is identified with the service instance; and
   upon receiving at the peripheral device a new service order that is identified with the selected service instance and reaches the peripheral device before the peripheral device receives a response to the read request, executing the new service order and ignoring the response when it is received.

2. The method according to claim 1, wherein receiving the service orders comprise receiving entries written by the applications to a doorbell register at an address on the bus that is assigned to the peripheral device.

3. The method according to claim 1, wherein the software applications submit the service orders by posting a write operation to the bus, and wherein the bus operates in accordance with a protocol that causes posted writes to be flushed from the bus to the peripheral device before delivering read responses.

4. The method according to claim 1, further comprising executing the service orders on a given service instance by reading into the peripheral device a context of the given service instance from the memory, and applying the context in performing an operation indicated by the service order.

5. The method according to claim 4, wherein the peripheral device has no dedicated memory for storing the context after the operation has been completed.

6. The method according to claim 1, further comprising setting a flag in the peripheral device to indicate that the one or more of the service orders have been dropped, and wherein initiating the recovery comprises reading and resetting the flag to initiate the recovery.

7. The method according to claim 6, wherein the flag is one of an array of flags in the peripheral device, and each flag causes the peripheral device to initiate the recovery of a corresponding set of the service instances.

8. The method according to claim 1, wherein initiating the recovery comprises making a record of the service instances that are in recovery, and wherein ignoring the response comprises checking the record to determine that the service instance is in recovery, and discarding the response responsively to the record.

9. The method according to claim 1, wherein the peripheral device comprises an input/output (I/O) device, and wherein the execution of the service orders causes the I/O device to transfer data to and from the memory.

10. The method according to claim 9, wherein the I/O device comprises a network interface controller (NIC), and wherein the service instances comprise queue pairs, which are respectively assigned to the software applications for use in communicating over a network via the NIC.

11. The method according to claim 9, wherein the service orders indicate descriptors comprising direct memory access (DMA) instructions for execution by the peripheral device.

12. The method according to claim 9, wherein the service orders cause the peripheral device to arm a completion queue in the memory in order to trigger an event upon posting of a new completion queue entry to the armed completion queue.

13. A computer peripheral device, comprising:
   a host interface, which is configured to be connected to a bus, which is coupled to a host processor and a memory, and is configured to receive over the bus service orders, which are identified with respective service instances and are submitted by software applications running on the host processor, which write copies of the service orders to the memory; and
   processing circuitry, which is configured to queue the received service orders in a queue for execution, and when one or more of the service orders are dropped from the queue prior to execution, to initiate a recovery of a selected service instance by submitting a read request via the host interface to the memory over the bus to receive a copy of any unexecuted service order that is identified with the service instance,
   wherein the processing circuitry is configured, upon receiving via the host interface a new service order that is identified with the selected service instance and reaches the peripheral device before the processing circuitry receives a response to the read request, to execute the new service order and ignore the response when it is received.

14. The apparatus according to claim 13, wherein the service orders comprise entries written by the applications to a doorbell register at an address on the bus that is assigned to the peripheral device.

15. The apparatus according to claim 13, wherein the software applications submit the service orders by posting a write operation to the bus, and wherein the bus operates in accordance with a protocol that causes posted writes to be flushed from the bus to the peripheral device before delivering read responses.

16. The apparatus according to claim 13, wherein the processing circuitry is configured to execute the service orders on a given service instance by reading into the peripheral device a context of the given service instance from the memory, and applying the context in performing an operation indicated by the service order.

17. The apparatus according to claim 16, wherein the peripheral device has no dedicated memory for storing the context after the operation has been completed.

18. The apparatus according to claim 13, wherein the processing circuitry is configured to set a flag in the peripheral device to indicate that the one or more of the service orders have been dropped, and to read and reset the flag in order to initiate the recovery.

19. The apparatus according to claim 18, wherein the flag is one of an array of flags in the peripheral device, and each flag causes the processing circuitry to initiate the recovery of a corresponding set of the service instances.

20. The apparatus according to claim 13, wherein the processing circuitry is configured to make a record of the service instances that are in recovery, to check the record to determine that the service instance is in recovery, and to discard the response responsively to the record.

21. The apparatus according to claim 13, wherein the peripheral device comprises an input/output (I/O) device, and wherein the execution of the service orders causes the processing circuitry to transfer data to and from the memory.

22. The apparatus according to claim 21, wherein the I/O device comprises a network interface controller (NIC), and wherein the service instances comprise queue pairs, which are respectively assigned to the software applications for use in communicating over a network via the NIC.

23. The apparatus according to claim 22, wherein the service orders indicate descriptors comprising direct memory access (DMA) instructions for execution by the peripheral device.

24. The apparatus according to claim 22, wherein the service orders cause the processing circuitry to arm a completion queue in the memory, and to trigger an event upon posting of a new completion queue entry to the armed completion queue.

\* \* \* \* \*